United States Patent
Sawanishi et al.

(10) Patent No.: US 9,821,404 B2
(45) Date of Patent: Nov. 21, 2017

(54) RESISTANCE SPOT WELDING METHOD

(71) Applicant: JFE STEEL CORPORATION, Tokyo (JP)

(72) Inventors: Chikaumi Sawanishi, Tokyo (JP); Yasuaki Okita, Tokyo (JP); Rinsei Ikeda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 15/035,809

(22) PCT Filed: Dec. 22, 2014

(86) PCT No.: PCT/JP2014/084741
§ 371 (c)(1),
(2) Date: May 11, 2016

(87) PCT Pub. No.: WO2015/099192
PCT Pub. Date: Jul. 2, 2015

(65) Prior Publication Data
US 2016/0271720 A1    Sep. 22, 2016

(30) Foreign Application Priority Data
Dec. 27, 2013 (JP) .................................. 2013-273246

(51) Int. Cl.
*B23K 11/10* (2006.01)
*B23K 11/24* (2006.01)
(Continued)

(52) U.S. Cl.
CPC ............. *B23K 11/24* (2013.01); *B23K 11/115* (2013.01); *B23K 11/241* (2013.01); *B23K 2203/04* (2013.01)

(58) Field of Classification Search
CPC ..... B23K 11/24; B23K 11/115; B23K 11/241; B23K 2203/04
(Continued)

(56) References Cited

U.S. PATENT DOCUMENTS 4,849,601 A   7/1989 Haefner et al.
6,057,523 A   5/2000 Fujii et al.
(Continued)

FOREIGN PATENT DOCUMENTS

EP    0 127 299 A1   12/1984
EP    3053693 A1    8/2016
(Continued)

OTHER PUBLICATIONS

Mar. 24, 2015 International Search Report issued in International Patent Application No. PCT/JP2014/084741.
(Continued)

*Primary Examiner* — Thien S Tran
(74) *Attorney, Agent, or Firm* — Oliff PLC

(57) ABSTRACT

In a resistance spot welding method, test welding and actual welding in which a current pattern is divided into two or more steps are performed. In the test welding, a constant current of a different value is passed in each step, and a time variation of an instantaneous amount of heat generated per unit volume and a cumulative amount of heat generated per unit volume are stored as a target value. In the subsequent actual welding, when a time variation amount of an instantaneous amount of heat generated per unit volume deviates during any step from the results of the test welding, a current passage amount is controlled to compensate for the difference during a remaining welding time in the step. In the test welding, $0.3 \times I_x \leq I_a < I_x$, where $I_a$ is the current in the first step, and $I_x$ is the current in second and subsequent steps.

2 Claims, 5 Drawing Sheets

(51) Int. Cl.
*B23K 11/11* (2006.01)
*B23K 103/04* (2006.01)

(58) Field of Classification Search
USPC .......... 219/78.01, 86.7, 109, 110, 117.1, 162
See application file for complete search history.

(56) References Cited

U.S. PATENT DOCUMENTS

| | | | |
|---|---|---|---|
| 6,130,396 A | 10/2000 | Hasegawa et al. | |
| 2007/0119823 A1* | 5/2007 | Filev | B23K 11/252 219/110 |

FOREIGN PATENT DOCUMENTS

| | | |
|---|---|---|
| JP | H09-216071 A | 8/1997 |
| JP | H10-94883 A | 4/1998 |
| JP | H11-33743 A | 2/1999 |
| JP | 2010-221284 A | 10/2010 |
| JP | 2010-240740 A | 10/2010 |
| JP | 2010-247215 A | 11/2010 |
| JP | 2010247215 A * | 11/2010 |
| WO | 2014/136507 A1 | 9/2014 |
| WO | 2014/156290 A1 | 10/2014 |

OTHER PUBLICATIONS

Sep. 27, 2016 Search Report issued in European Patent Application No. 14874195.2.

* cited by examiner (A)

1mm (B)

(A)

1mm (B)

(A)

(B)

(A)

(B)

(A)

(B)

RESISTANCE SPOT WELDING METHOD

TECHNICAL FIELD

This disclosure relates to a method of resistance spot welding, in particular to a method allowing formation of an appropriate nugget using adaptive control welding.

BACKGROUND

Resistance spot welding, which is a type of lap resistance welding, is typically used to join overlapping steel sheets. This welding method is a method to join two or more overlapping steel sheets by applying a high welding current for a short time between a pair of electrodes squeezing the steel sheets from above and below. A point-like weld is obtained using the resistance heat generated by passing the high welding current. Such a point-like weld is referred to as a nugget and is the portion were both of the overlapping steel sheets fuse and coagulate at a location of contact between the steel sheets when current is applied to the steel sheets. The steel sheets are joined in a point-like manner by this nugget.

In order to obtain good weld quality, it is important to form a nugget which has an appropriate diameter. The nugget diameter is determined by welding conditions such as the welding current, welding time, electrode shape, electrode force, and the like. Therefore, to form an appropriate nugget diameter, the above welding conditions need to be set appropriately in accordance with the conditions of parts to be welded, such as the material properties, sheet thickness, number of sheets overlapped, and the like.

For example, when manufacturing automobiles, spot welding is performed at several thousand points per automobile, and workpieces that arrive one after another need to be welded. At this time, if the conditions of parts to be welded, such as the material properties, sheet thickness, number of sheets overlapped, and the like are identical, then at each welding location, the same nugget diameter can be obtained under the same welding conditions such as the welding current, welding time, electrode force, and the like. During consecutive welding, however, the surfaces of the electrodes in contact with the parts to be welded gradually wear as welding is performed multiple times, so that the contact area between the electrodes and the parts to be welded gradually expands. If the same welding current as during the first welding is applied after the contact area has thus expanded, the current density in the parts to be welded lowers, and the temperature rise in the weld is reduced. The nugget diameter therefore decreases. Hence, for every several hundred to several thousand spots of welding, the electrodes are either dressed or replaced, so that the electrode tip diameter does not expand excessively.

A resistance welding device provided with a function (stepper function) to increase the welding current after welding a predetermined number of times, so as to compensate for the reduction in current density due to wear of the electrodes, has also been used conventionally. To use that stepper function, the above-described pattern for changing the welding current needs to be set appropriately in advance. Doing so, however, requires that tests or the like be performed to derive a pattern for changing the welding current that corresponds to numerous conditions of parts to be welded and welding conditions, which is highly time-consuming and expensive. The state of progress of electrode wear also varies during actual work. Therefore, the predetermined pattern for changing the welding current cannot always be considered appropriate.

Furthermore, if there is a disturbance at the time of welding, such as when a point that has already been welded (existing weld) is located near the point being welded, or when the surface of the parts to be welded is highly uneven and a contact point between the parts to be welded is located near the point being welded, then current diverts to the existing weld or the contact point. In such a state, the current density is reduced at the position to be welded directly below the electrodes, even when welding under predetermined conditions. A nugget of sufficient diameter therefore cannot be obtained. In order to compensate for this insufficient amount of heat generated and to obtain a nugget of sufficient diameter, it becomes necessary to set a high welding current in advance.

Techniques such as the following have been proposed to resolve the above problem. For example, JP H9-216071 A (PTL 1) discloses a control unit of a resistance welder that obtains a set nugget by comparing an estimated temperature distribution of the weld with a target nugget and controlling output of the welder.

JP H10-941883 A (PTL 2) discloses a method of controlling welding conditions of a resistance welder to achieve good welding by detecting the welding current and the voltage between tips, performing a simulation of the weld by heat transfer calculation, and estimating the formation state of the nugget.

Furthermore, JP H11-33743 A (PTL 3) discloses a welding system that first uses the sheet thickness of the parts to be welded and the welding time to calculate the cumulative amount of heat generated per unit volume that allows good welding of the parts being welded and then adjusts the welding current or voltage that yields the calculated amount of heat generated per unit volume and unit time. A good weld can be achieved using this system, regardless of the type of parts to be welded or the wear state of the electrodes.

With the resistance spot welding methods in PTL 1 and PTL 2, however, complicated calculations are necessary in order to estimate the temperature of the nugget based on a heat transfer model (heat transfer simulation) or the like. The structure of the welding control unit not only becomes complicated, but the welding control unit itself also becomes expensive.

The resistance spot welding method recited in PTL 3 always allows good welding regardless of the degree of electrode wear by using the cumulative amount of heat generated as a target value and controlling the welding current or voltage. If the set conditions of parts to be welded and the actual conditions of parts to be welded greatly differ, however, for example in cases such as when there is a disturbance nearby such as the aforementioned existing weld, when the time variation pattern of the amount of heat generated changes greatly in a short period of time, or when welding hot-dip galvanized steel sheets with a large coating weight, then adaptive control cannot be performed accurately with this welding method. Accordingly, even if the final cumulative amount of heat generated can be matched to the target value, the form of heat generation, i.e. the pattern of the amount of heat (change in temperature over time) in the weld, deviates from the pattern of the amount of heat that yields the desired good weld. In this case, the necessary nugget diameter might not be obtained, or splashing may occur. For example, when the effect of shunt current is large, then attempting to match the cumulative amount of heat generated to the target value causes significant heat generation near a location between the electrode and the steel sheet instead of between the steel sheets and increases the likelihood of splashing from the steel sheet surface.

Furthermore, all of the techniques in PTL 1 to PTL 3 effectively address the change when the electrode tip wears but do not at all take into account the case of shunt current having a large effect, such as when the distance from an existing weld is short. Hence, adaptive control sometimes does not actually work.

CITATION LIST

Patent Literature

PTL 1: JP H9-216071 A
PTL 2: JP H10-94883 A
PTL 3: JP H11-33743 A
PTL 4: Japanese Patent Application Number 2013-047180

SUMMARY

Technical Problem

Therefore, we developed the following method and applied for a patent in Japanese Patent Application Number 2013-047180 (PTL 4):
"A method of resistance spot welding to join parts to be welded by squeezing and pressing the parts between a pair of electrodes and passing current, the parts being a plurality of overlapping metal sheets, the method comprising:

performing test welding and actual welding in which a current pattern is divided into two or more steps, wherein in the test welding, a constant current of a predetermined value is passed in each step, and a time variation of an instantaneous amount of heat generated per unit volume and a cumulative amount of heat generated per unit volume that are calculated from an electrical property between electrodes when forming an appropriate nugget are stored as a target value, in the subsequent actual welding, welding is started using, as a standard, a time variation curve of the instantaneous amount of heat generated per unit volume obtained by the test welding, and when a time variation amount of an instantaneous amount of heat generated per unit volume deviates during any step of the actual welding from the time variation curve by a difference, a current passage amount is controlled in order to compensate for the difference during a remaining welding time in the step so as to match a cumulative amount of heat generated per unit volume in the actual welding to the cumulative amount of heat generated per unit volume that is determined in advance in the test welding".

The technique disclosed in PTL 4 allows a nugget with a good diameter to be obtained even when the electrode tip is worn or when there is a disturbance. When the welding conditions are special, however, such as when a particularly large nugget diameter needs to be ensured, when an existing weld is located immediately by the welding point, or when several existing welds are located around the welding point, then in some cases the heat generation near the electrode becomes excessively large, leading to splashing, and a nugget with a satisfactory diameter might not be obtained.

It would therefore be helpful to provide a method of resistance spot welding that can yield a nugget with an appropriate diameter without increasing the welding time or causing splashing, even under the above-described special welding conditions.

Solution to Problem

We therefore made intensive studies to achieve such a method. As described above, when the electrode tip is worn or when there is a disturbance, then even if the cumulative amount of heat generated is matched to the target value, the form of heat generation, i.e. the pattern of the amount of heat in the weld, deviates from the pattern in the state when the desired good weld was obtained. At this time, the necessary nugget diameter might not be obtained, or splashing may occur.

Before resistance spot welding and during the initial phase of welding, resistance is high between the steel sheets at the spot to be welded, and the current path has not been secured. Therefore, when the effect of shunt current is large in this state, such as when there is a disturbance, attempting to match the cumulative amount of heat generated to the target value greatly increases the current in a state in which the current path between the steel sheets has not been secured. Hence, heat generation becomes significant near a location between the electrode and the steel sheet instead of between the steel sheets. As a result, the form of heat generation ends up differing greatly from the form of heat generation during the test welding.

Further study based on these observations revealed that, at the time of test welding, by setting the current in the first step for securing the current path between sheets directly below the electrodes to be smaller than the current set in the second and subsequent steps for forming the nugget, heat generation near the electrodes is effectively controlled during initial welding. As a result, the temperature distribution of the weld can be matched to the target temperature distribution (pattern of the amount of heat) of the test welding. Our method is based on these findings.

We thus provide:

(1) A resistance spot welding method to join parts to be welded by squeezing and pressing the parts between a pair of electrodes and passing current, the parts being a plurality of overlapping metal sheets, the method comprising:

performing test welding and actual welding in which a current pattern is divided into two or more steps, wherein in the test welding, a constant current of a different value is passed in each step, and a time variation of an instantaneous amount of heat generated per unit volume and a cumulative amount of heat generated per unit volume that are calculated from an electrical property between electrodes when forming an appropriate nugget are stored as a target value, in the subsequent actual welding, welding is started using, as a standard, a time variation curve of the instantaneous amount of heat generated per unit volume obtained by the test welding, when a time variation amount of an instantaneous amount of heat generated per unit volume deviates during any step of the actual welding from the time variation curve by a difference, a current passage amount is controlled in order to compensate for the difference during a remaining welding time in the step so as to match a cumulative amount of heat generated per unit volume in the actual welding to the cumulative amount of heat generated per unit volume that is determined in advance in the test welding, and in the test welling, $0.3 \times I_x \leq I_a < I_x$, where $I_a$ is a current in a first step, and $I_x$ is a current in second and subsequent steps.

(2) The method of (1), wherein current is passed in the first step to secure a current path between the metal sheets and in the second and subsequent steps to obtain a predetermined nugget diameter.

Advantageous Effect

According to this disclosure, a good nugget can be obtained without increasing the welding time or causing splashing, even under special welding conditions such as when a particularly large nugget diameter is required, when an existing weld is located immediately by the welding point, or when several existing welds are located around the welding point.

DETAILED DESCRIPTION

Figure 1:
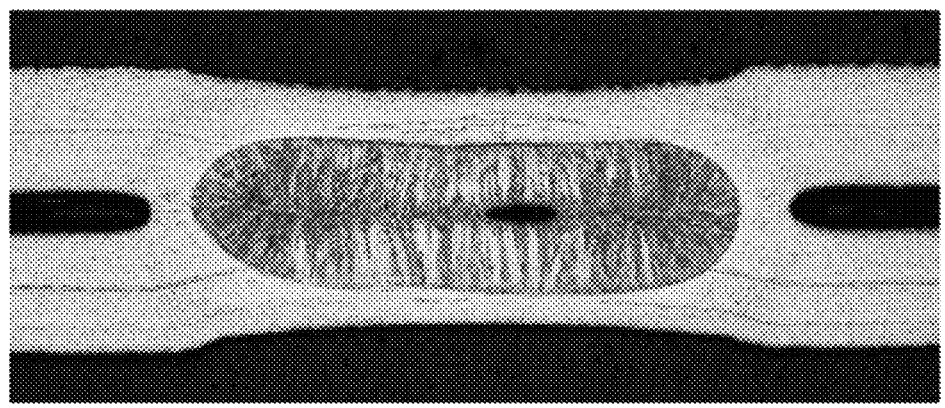
FIG. 1(a) is a weld cross-section after performing two-step test welding in one of the disclosed embodiments.
FIG. 1(b) illustrates the change over time of the welding current, electrical resistance, and cumulative amount of heat generated during the test welding.
Figure 1:
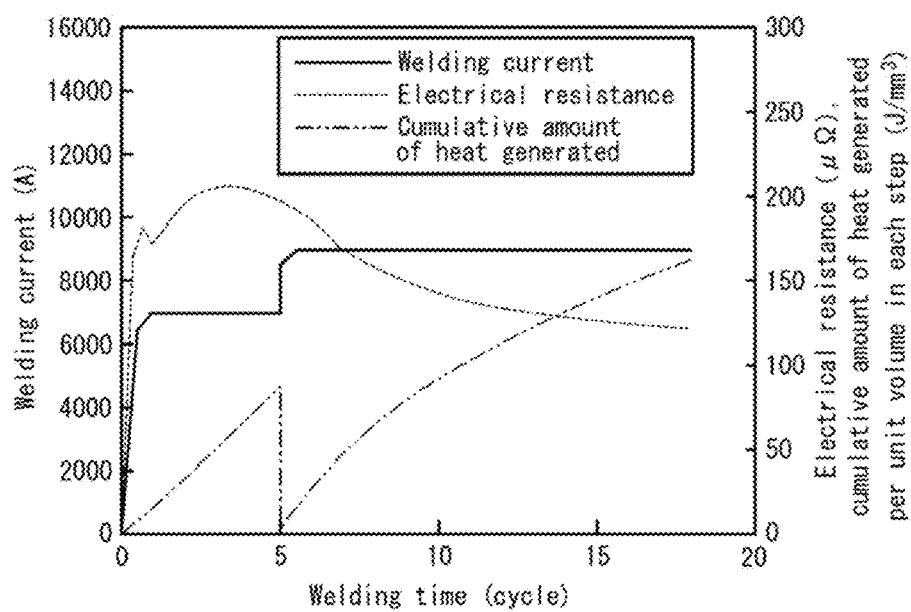

A method of resistance spot welding according to one of the disclosed embodiments includes dividing a current pattern into two or more steps in each of test welding and actual welding, such that in the test welding, a constant current of a different value is passed in each step, and a time variation of an instantaneous amount of heat generated per unit volume and a cumulative amount of heat generated per unit volume that are calculated from an electrical property between electrodes when forming an appropriate nugget are stored as a target value; in the actual welding, welding is started using, as a standard, a time variation curve of the instantaneous amount of heat generated per unit volume obtained by the test welding; when a time variation amount of an instantaneous amount of heat generated per unit volume deviates during any step from the time variation curve by a difference, a current passage amount is controlled in order to compensate for the difference during a remaining welding time in the step so as to match a cumulative amount of heat generated per unit volume in the actual welding to the cumulative amount of heat generated per unit volume that is determined in advance in the test welding; and in the test welding, $I_a$ is controlled so that $0.3 \times I_x \leq I_a < I_x$, here $I_a$ is the current in the first step, and $I_x$ is the current in the second and subsequent steps. Furthermore, current is preferably passed in the first step to secure a current path between the metal sheets (for example, steel sheets) and in the second and subsequent steps to obtain a predetermined nugget diameter. In this disclosure, the above-mentioned actual welding is referred to as "adaptive control welding".

First, the test welding is described. In this example, the case of welding with two steps current pattern is described. Using a welding test body of the same type of steel and thickness as the parts to be welded, preliminary welding is performed under a variety of conditions with constant current control in a state with no gap and no shunt current to an existing weld. The optimal conditions (electrode force, welding time, and current) in the test welding are thus discovered. Specifically, the welding is performed as follows. An inverter DC resistance spot welder is preferable as the welder, and chromium copper electrodes with DR-shaped tips may be advantageously adapted for use as the electrodes.

In the preliminary welding and the test welding, the timing for division when dividing the current pattern into two steps may, for example, be a point in time at which a fused portion begins to form between the steel sheets that are the parts to be welded (the point in time at which the current path begins to form between sheets directly below the electrodes). In this case, in order to determine this timing, welding is performed a plurality of times with a constant electrode force F at different welding currents and welding times in order to discover the point in time at which the fused portion begins to form. Formation of the fused portion may be confirmed by a peel test. Assume that the fused portion forms at current $I_1$ and welding time $T_1$. These values are taken as the first step welding conditions in the test welding. While there may be a plurality of combinations of the "current $I_1$ and welding time $T_1$" at which the weld begins to form, it suffices for the current $I_1$ and welding time $T_1$ to be set to appropriate values taking into consideration the takt time and the possible occurrence of splashing. In the below-described Example, the current $I_1$=7.0 kA, and the welding time $T_1$=5 cyc.

Next, in order to determine the welding conditions that yield the necessary nugget diameter, after passing current at the same electrode force F, current $I_1$, and welding time $T_1$ as above, welding is performed a plurality of times at different welding times and currents as the current passage of the second step. The nugget diameter may be determined by a peel test or by cross-sectional observation at the nugget center (by etching with a saturated picric acid solution). Assume that the desired nugget diameter forms at current $I_2$ and welding time $T_2$. These values are taken as the second step welding conditions in the test welding. While there may be a plurality of combinations of the "current $I_2$ and welding time $T_2$" at which a nugget with the desired diameter forms, it suffices for the current $I_2$ and welding time $T_2$ to be set to appropriate values taking into consideration the takt time and the possible occurrence of splashing. In the below-described Example, the current $I_2$=9.0 kA, and the welding time $T_2$=13 cyc.

From the above experiment results, the conditions for test welding are determined as follows.

First step welding conditions: electrode force F, welding time $T_1$, welding current $I_1$ Second step welding conditions: electrode force F, welding time $T_2$ (equal to $T-T_1$), welding current $I_2$ Under these conditions, test welding was performed on parts to be welded of the same type of steel and thickness as the welding test body used in the preliminary welding. The time variation of the instantaneous amount of heat generated per unit volume and the cumulative amount of heat generated per unit volume that are calculated from an electrical property between electrodes during the test welding are then stored for each step as target values. In this disclosure, the "electrical property between electrodes" refers to the resistance between electrodes or the voltage between electrodes.

In this embodiment, it is important for the relationship between the currents in the above-described welding in the first step and welding in the subsequent second step to be controlled appropriately. This point is described below.

After the above-described test welding, actual welding is performed. The actual welding may be performed on different parts to be welded that are of the same type of steel and thickness as the parts welded in the test welding or may be performed on a different portion of the parts welded in the test welding. In the actual welding, welding is started using, as a standard, a time variation curve of the instantaneous amount of heat generated per unit volume obtained by the test welding. In each of the steps, when the time variation amount of the instantaneous amount of heat generated per unit volume follows the time variation curve that is the standard, welding is performed as is to completion.

When the time variation amount of the instantaneous amount of heat generated per unit volume deviates during any step from the time variation curve that is the standard, however, adaptive control welding is performed. Specifically, the current passage amount is controlled to compensate for the difference during the remaining welding time in the step. In this way, the cumulative amount of heat generated per unit volume in the actual welding is matched to the cumulative amount of heat generated per unit volume determined in advance in the test welding. As a result, the necessary cumulative amount of heat generated is guaranteed even when the electrode tip wears or when a disturbance is present, thereby yielding a nugget with an appropriate diameter.

While the method of calculating the amount of heat generated per unit volume is not limited, PTL 3 discloses one example, which may be used in this embodiment. The cumulative amount of heat generated Q per unit volume is calculated with this method as follows.

Let the total thickness of the two parts to be welded be t, the electrical resistivity of the parts to be welded be r, the voltage between electrodes be V, the welding current be I, and the area of contact between the electrodes and the parts to be welded be S. In this case, the welding current passes through a columnar portion with an area S and thickness t, generating resistance heat. The amount of heat generated q per unit volume and unit time in this columnar portion is determined with Equation (1) below.

$$q = (V \cdot I)/(S \cdot t) \qquad \text{Equation (1):}$$

The electrical resistance R of this columnar portion is calculated with Equation (2) below.

$$R = (r \cdot t)/S \qquad \text{Equation (2):}$$

By solving for S in Equation (2) and substituting into Equation (1), the amount of heat generated q is given by Equation (3) below.

$$q = (V \cdot I \cdot R)/(r \cdot t^2) \qquad \text{Equation (3)}$$
$$= (V^2)/(r \cdot t^2)$$

As is clear from Equation (3) above, the amount of heat generated q per unit volume and unit time is not affected by the area S of contact between the electrodes and the parts being welded. In Equation (3), the amount of heat generated q is calculated from the voltage between electrodes V, but the amount of heat generated q may also be calculated from the current between electrodes I. In this case as well, the area S of contact between the electrodes and the parts being welded need not be used.

Accumulating the amount of heat generated q per unit volume and unit time over the entire welding time period yields the cumulative amount of heat generated Q per unit volume that is added during welding. As is clear from Equation (3), this cumulative amount of heat generated Q per unit volume can also be calculated without using the area S of contact between the electrodes and the parts being welded.

While the case of calculating the cumulative amount of heat generated Q using the method disclosed in PTL 3 has been described, other methods of calculation may of course be used.

When the disturbance is extremely pronounced, for example in cases such as
(1) when a particularly large nugget diameter needs to be ensured (for example, a nugget diameter of $4.5\sqrt{t}$ or greater), or
(2) when an existing weld is located immediately by the welding point (for example when the distance between the welding point and an existing weld is 7 mm or less), or when several existing welds are located around the welding point (for example, when three or more existing welds are located around the welding point),
then the pattern of the amount of heat in the weld differs from the target pattern of the amount of heat in the test welding. In some cases the heat generation near the electrode becomes excessively large, leading to splashing, and a nugget with a satisfactory diameter might not be obtained, as described above.

Therefore, as one of the disclosed embodiments, the following describes an example in which the interval between the weld and an existing weld is narrow. In this case as well, the test welding and the actual welding are both performed by dividing the current pattern into two steps.

In the first step, current is passed in the first step until the interface between the steel sheets disappears and in the second step until a predetermined nugget diameter is obtained, as described above. In the first step, a fused portion may form slightly in the first step as long as splashing does not occur when performing adaptive control.

In this embodiment, the following two points are important: that during the test welding, the relationship between the currents in the above-described first step (for securing the current path between sheets directly below the electrodes) and in the subsequent second step (for forming a nugget of a predetermined diameter) be controlled appropriately, and that during the actual welding, the temperature near the electrodes be effectively lowered to match the pattern of the amount of heat in the weld during actual welding to the target pattern of the amount of heat in the test welding.

The first step and second step of the test welding are performed, and the time variation of the instantaneous amount of heat generated per unit volume and the cumulative amount of heat generated per unit volume in each step are stored.

In the actual welding, welding is started using, as a standard, a time variation curve of the instantaneous amount of heat generated per unit volume obtained by the test welding. When the time variation amount of the instantaneous amount of heat generated per unit volume deviates during any step from the time variation curve by a difference, the current passage amount (specifically, the welding current) is controlled in order to compensate for the difference during the remaining welding time in the step. In this way, the cumulative amount of heat generated per unit volume in each step of the actual welding is caused to match the cumulative amount of heat generated per unit volume that was stored in the test welding. As a result, regardless of whether there is shunt current due to an extremely close existing weld, the heat generation pattern in each step of the actual welding can be matched to the heat generation pattern of the test welding. As a result, stable nugget formation can be achieved even in the presence of a special disturbance.

In this embodiment, during the test welding, $I_x$ and $I_x$ are controlled so that $$0.3 \times I_x \leq I_a < I_x$$

where $I_a$ is the current in the first step, and $I_x$ is the current in the second and subsequent steps. If the current $I_a$ is less than $0.3 \times I_x$ in the first step, the amount of heat generated is low in the actual welding, and a current path between the steel sheets cannot be ensured, causing splashing in the second and subsequent steps. Conversely, if the current $I_a$ is $I_x$ or greater in the first step, then splashing tends to occur in the first step of the actual welding when the cumulative amount of heat generated per unit volume in the actual welding diverges greatly from the cumulative amount of heat generated per unit volume that was stored in the test welding (target value).

In both the test welding and the actual welding, the welding time $T_1$ (cycle/50 Hz) in the first step is preferably set to be 3 cycles or more to 10 cycles or less. If the welding time $T_1$ is less than 3 cycles in the first step, the amount of heat generated is low, and a current path between the steel sheets cannot be ensured, causing splashing in the second and subsequent steps. Conversely, if the welding time $T_1$ is greater than 10 cycles in the first step, then splashing tends to occur in the first step of the actual welding when the cumulative amount of heat generated per unit volume in the actual welding diverges greatly from the target value. A fused portion may form slightly in the first step as long as splashing does not occur when performing adaptive control, as described above.

In both the test welding and the actual welding, the electrode force F in each step is preferably set to approximately 1.0 kN to 7.0 kN. The electrode force F in the test welding and the actual welding may be the same or may differ. As necessary, the electrode force F may be varied during welding.

While the case of dividing the current pattern during test welding and actual welding into two steps has mainly been described, the current pattern may be divided into three steps in this disclosure as necessary. The number of steps is the same in the test welding and the actual welding in this disclosure.

In other words, when the parts to be welded are coated steel sheets, three-step division that takes fusion of the coating into account is more preferable. The reason is that when the effect of shunt current directly below the electrodes is large and coating is present, the phenomena up until a stable current path forms below the electrodes differ greatly. Since the melting point of the coating is lower than that of the steel sheets, the coating between the steel sheets first fuses after passage of current begins, and a portion of the fused coating is expelled from between the steel sheets due to the electrode force. The coating that is expelled at this time expands the current conducting area, thereby greatly reducing the resistance between electrodes during welding. Conversely, the specific resistance of the parts to be welded increases along with a rise in temperature. Therefore, the specific resistance increases as the welding time lengthens. In other words, after the decrease in resistance between electrodes due to the expanded current conducting area, an increase in the resistance between electrodes occurs due to the rise in temperature of the parts to be welded. Subsequently, the fused portion forms. Therefore, the welding process is divided into three steps, i.e. the step in which the coating fuses and the current conducting area expands suddenly, the step up until a stable current path (fused portion) forms between the electrodes due to subsequent passage of current, and the subsequent nugget formation step, and then adaptive control welding to compensate for the cumulative amount of heat generated per unit volume is performed in each step. During resistance spot welding of coated steel sheets, this approach allows a stable current path to be formed and allows stable nugget growth in the subsequent third step, even if an existing weld is located nearby.

EXAMPLES

Example 1

As the parts to be welded, steel material with a thickness of 1.6 mm (270 MPa) was prepared. The test welding and the actual welding were both performed by dividing the current pattern into two steps.

Using the above-described method, two sheets of the parts to be welded were overlapped and preliminarily welded with constant current control in a state with no gap or shunt current to an existing weld. The welding conditions for obtaining a suitable nugget diameter were thus obtained. An inverter DC resistance spot welder was used as the welder, and chromium copper electrodes with 6 mm face diameter DR-shaped tips were used as the electrodes. As a result, the welding conditions in the test welding were set as follows: electrode force of 3.5 kN, welding current of 7.0 kA, and welding time of 5 cyc in the first step, and electrode force of 3.5 kN, welding current of 9.0 kA, and welding time of 13 cyc in the second step. In this disclosure, the welding time is displayed as the number of cycles at 50 Hz.

Test welding was performed under these welding conditions on different parts of the same type of steel and thickness as the steel material used in the preliminary welding, and the time variation of the instantaneous amount of heat generated per unit volume and the cumulative amount of heat generated per unit volume were stored in each step as target values.

FIG. 1(a) illustrates a weld cross-section after performing this test welding, and FIG. 1(b) illustrates the change over time of the welding current, electrical resistance, and cumulative amount of heat generated during the test welding. As illustrated in FIG. 1(a), during the test welding, a nugget diameter of 6.2 mm (approximately 5√t) was obtained. The cumulative amount of heat generated in the first step was 88 J, and the target cumulative amount of heat generated in the second step was 163 J. These values were set as target values.

Next, actual welding was performed under the following conditions on different parts of the same type of steel and thickness as the steel material used in the test welding. Specifically, adaptive control welding according to this disclosure was performed, using the above-mentioned test welding as a standard, under the conditions of an existing weld being located near the welding point (distance between centers of welding points: 10 mm) and the effect of shunt current being large. In other words, resistance spot welding was started using, as a standard, the time variation curve of the instantaneous amount of heat generated per unit volume obtained by test welding. When the time variation amount of the instantaneous amount of heat generated per unit volume deviated in either of the first and second steps from the time variation curve by a difference, the current passage amount, i.e. the welding current, was controlled in order to compensate for the difference during the remaining welding time in the step.

Figure 2:
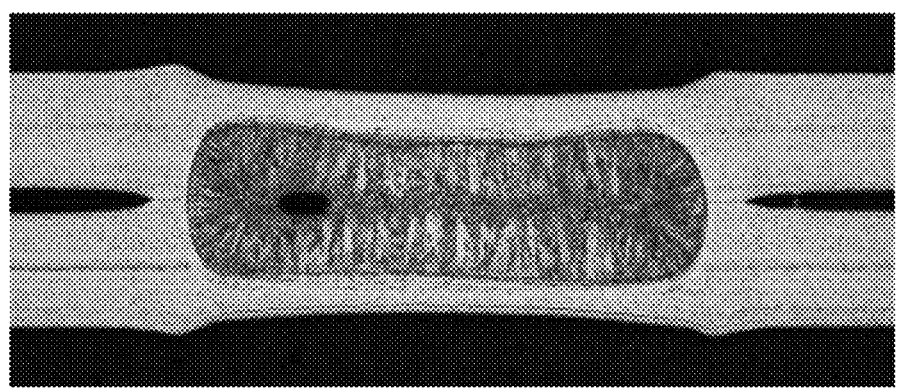
FIG. 2(a) is a weld cross-section after performing two-step actual welding (adaptive control welding) in one of the disclosed embodiments.
FIG. 2(b) illustrates the change over time of the welding current, electrical resistance, and cumulative amount of heat generated during the actual welding.
Figure 2:
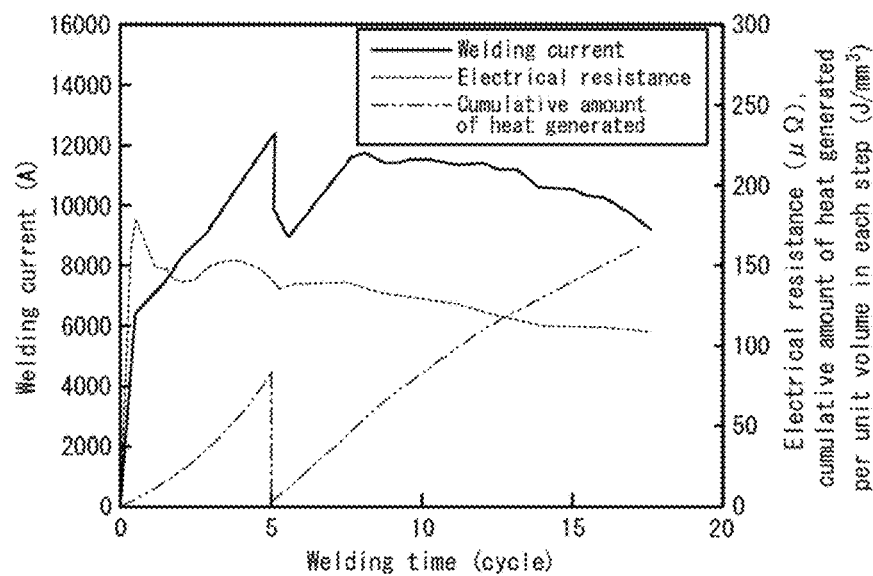

FIG. 2(a) illustrates a weld cross-section after performing this actual welding, and FIG. 2(b) illustrates the change over time of the welding current, electrical resistance, and cumulative amount of heat generated during the actual welding. As illustrated in FIG. 2(b), in Example 1, the welding current varies greatly in order for the cumulative amount of heat generated in each step to be similar to that of the test welding. As a result, the nugget diameter was 6.2 mm, thus yielding nearly the target nugget diameter. Furthermore, splashing or other such welding defects did not occur. The cumulative amount of heat generated was 85 J in the first step and 165 J in the second step. Hence, nearly the same cumulative amount of heat generated was obtained as in the test welding.

Comparative Example 1

Under the same condition of an existing weld being located near the welding point (distance between centers of welding points: 10 mm), steel material with a thickness of 1.6 mm (270 MPa) was subjected to resistance spot welding by constant current control. The welding conditions were the same as in the above-described test welding (electrode force of 3.5 kN, welding current of 7.0 kA, and welding time of 5 cyc in the first step, and electrode force of 3.5 kN, welding current of 9.0 kA, and welding time of 13 cyc in the second step).

Figure 3:
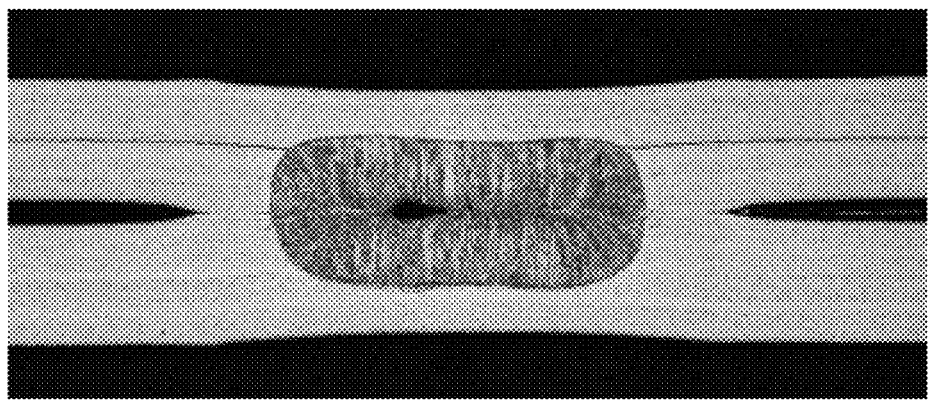
FIG. 3(a) is a weld cross-section after performing two-step constant current control welding in Comparative Example 1.
FIG. 3(b) illustrates the change over time of the welding current, electrical resistance, and cumulative amount of heat generated during the welding.
Figure 3:
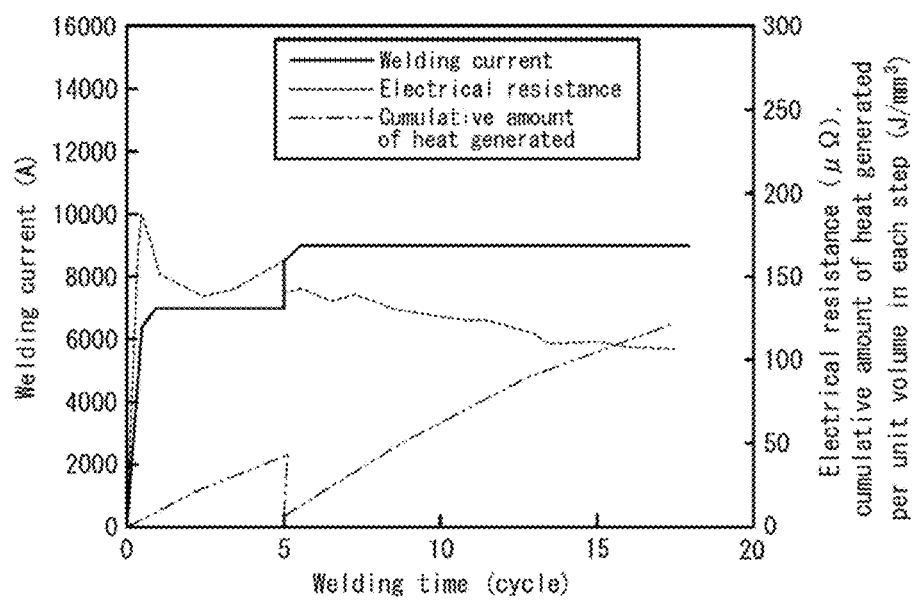

FIG. 3(a) illustrates a weld cross-section after this welding, and FIG. 3(b) illustrates the change over time of the welding current, electrical resistance, and cumulative amount of heat generated during the welding. The cumulative amount of heat generated was 42 J in the first step and 122 J in the second step. Hence, a reduction in the amount of heat due to shunt current was observed. Only a nugget with a small diameter of 4.3 mm was obtained.

Comparative Example 2

Conventional one-step adaptive control welding was performed with the following method.

First, in a state with no gap and no shunt current to an existing weld, test welding was performed on steel material with a thickness of 1.6 mm (270 MPa) under the conditions of an electrode force of 3.5 kN, welding time of 16 cyc, and welding current 9.0 kA. The time variation of the instantaneous amount of heat generated per unit volume and the cumulative amount of heat generated per unit volume were stored as target values.

Next, actual welding was performed under the following conditions on different parts of the same type of steel and thickness as the steel material used in the test welding. Specifically, adaptive control welding was performed, using the above-mentioned test welding as a standard, under the conditions of an existing weld being located near the welding point (distance between centers of welding points: 10 mm) and the effect of shunt current being large. In other words, resistance spot welding was started using, as a standard, the time variation curve of the instantaneous amount of heat generated per unit volume obtained by test welding. When the time variation amount of the instantaneous amount of heat generated per unit volume deviated from the time variation curve by a difference, the current passage amount, i.e. the welding current, was controlled in order to compensate for the difference during the remaining welding time in the step.

Figure 4:
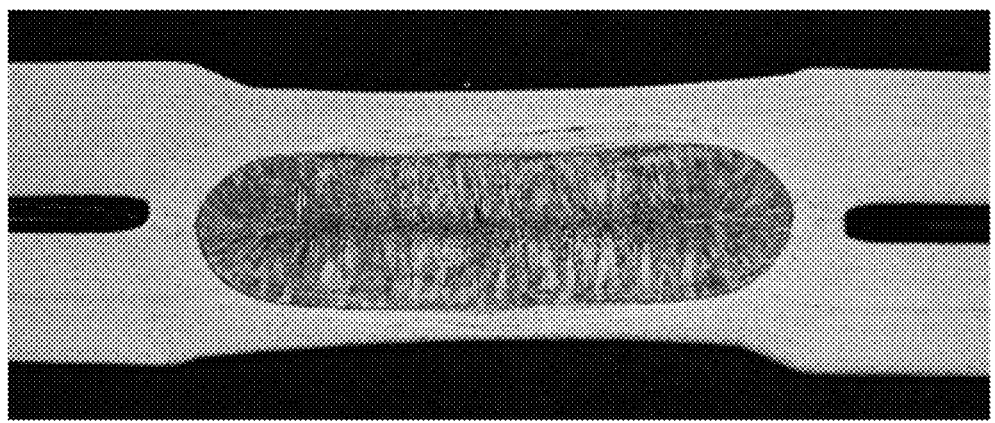
FIG. 4(a) is a weld cross-section after performing one-step test welding in Comparative Example 2.
FIG. 4(b) illustrates the change over time of the welding current, electrical resistance, and cumulative amount of heat generated during the test welding.
Figure 4:
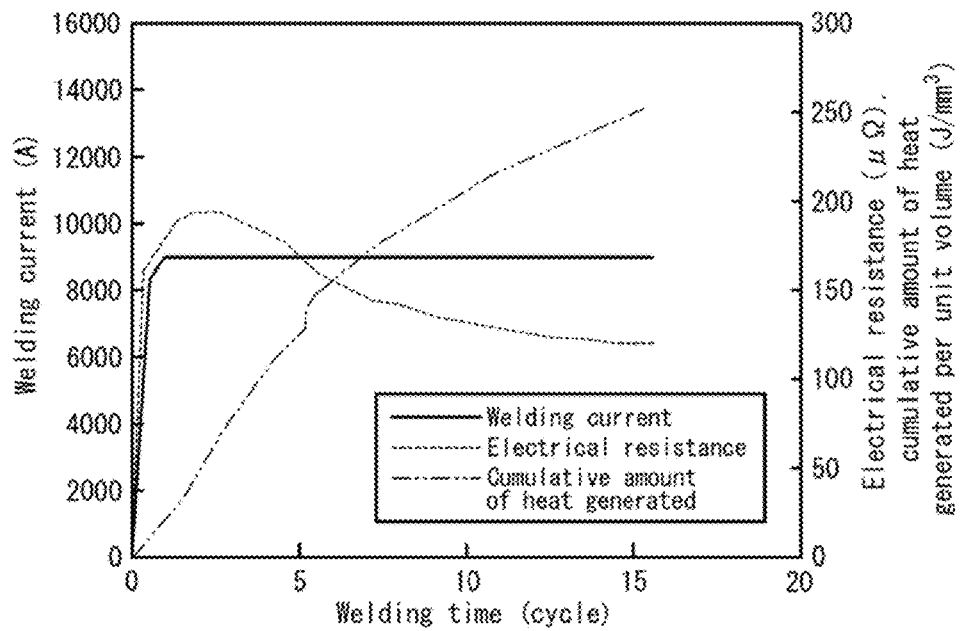
Figure 5:
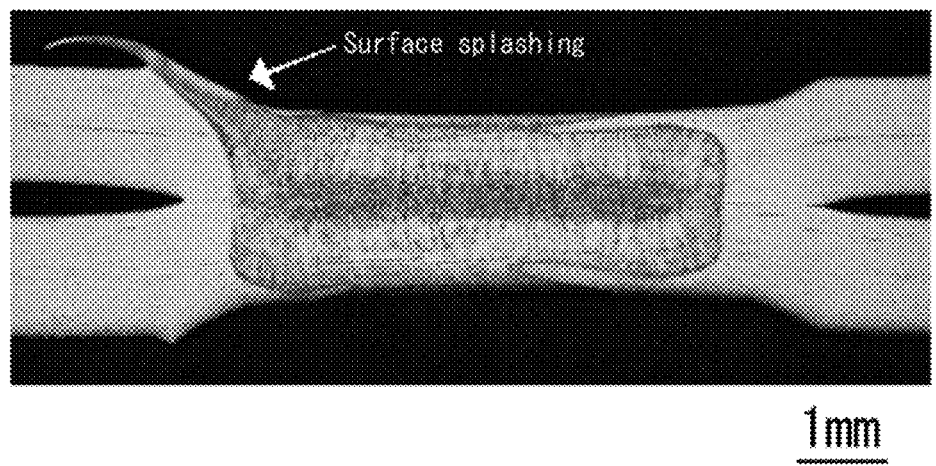
FIG. 5(a) is a weld cross-section after performing one-step actual welding (adaptive control welding) in Comparative Example 2.
FIG. 5(b) illustrates the change over time of the welding current, electrical resistance, and cumulative amount of heat generated during the actual welding.
Figure 5:
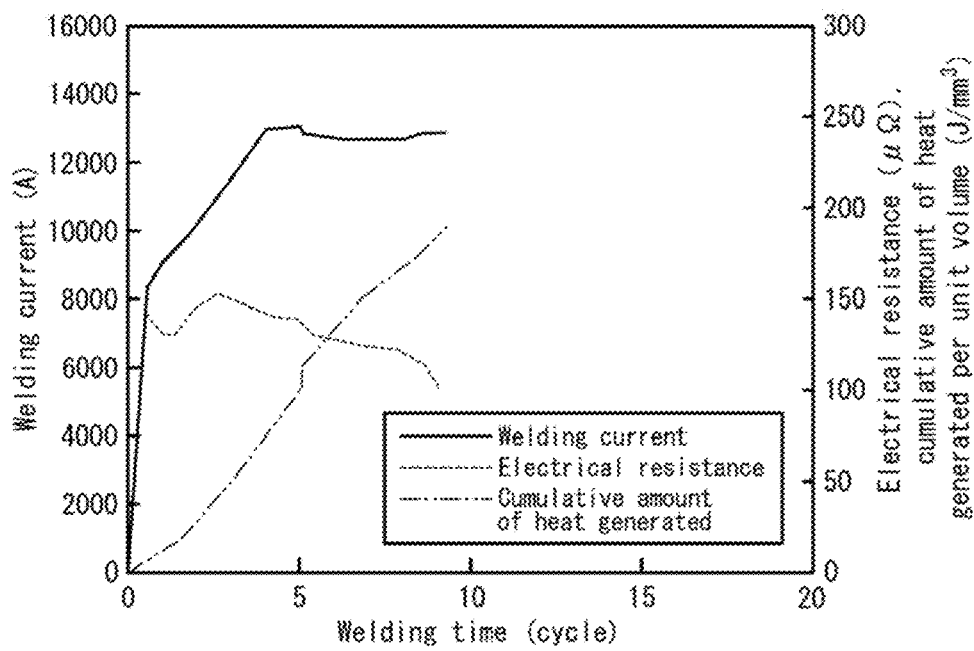

FIG. 4(a) illustrates a weld cross-section after this test welding, and FIG. 4(b) illustrates the change over time of the welding current, electrical resistance, and cumulative amount of heat generated during the test welding. FIG. 5(a) illustrates a weld cross-section after the actual welding, and FIG. 5(b) illustrates the change over time of the welding current, electrical resistance, and cumulative amount of heat generated during the actual welding. As illustrated in FIG. 4(a), during the test welding, a nugget diameter of 6.3 mm was obtained, and no splashing occurred. As illustrated in FIG. 5(a), however, surface splashing from the surface of the steel sheet occurred after the actual welding.

At the 9.5 cyc point in time at which splashing occurred during the actual welding, the target cumulative amount of heat generated in the test welding was 195 J, and the cumulative amount of heat generated in the actual welding was nearly equal at 190 J. From these results, it is clear that with conventional one-step adaptive control, even though the cumulative amount of heat generated was controlled appropriately, heat generation near the surface of the steel sheet occurred on a priority basis, causing splashing from the surface of the steel sheet to occur.

EXPERIMENTAL EXAMPLES

Next, resistance spot welding was performed using a sheet combination formed by overlapping two of the thin steel sheets listed in Table 1 and using the welding conditions listed in Table 1 to produce a weld joint. The test welding was performed under the conditions listed in Table 1 in a state with no existing weld. The actual welding was performed under the conditions listed in Table 1. In the "Control method of actual welding" in Table 1, "two-step adaptive control" is the method of actual welding described in Example 1, whereas "constant current control is the method described in Comparative Example 1, and "one-step adaptive control" is the method of actual welding described in Comparative Example 2.

The nugget diameter in the resulting weld joint was measured by slicing the weld, etching the cross-section, and observing under an optical microscope. The case of a nugget diameter of $4.5\sqrt{t}$ (t: sheet thickness (mm)) or greater being obtained without splashing was evaluated as good, and the case of a nugget diameter of less than $4.5\sqrt{t}$ and/or the occurrence of splashing was evaluated as poor. The obtained results are shown in Table 1.

TABLE 1

| No. | Steel sheet strength (MPa) | sheet thickness (mm) | electrode force (kN) | Test welding (for No. 19 and 20, actual welding conditions, since there was no test welding) | | | | Whether exsisting weld was present at time of actual welding; if so, distance between centers of welding points (mm) | Control method in the actual welding | Evaluation | Notes |
| --- | --- | --- | --- | --- | --- | --- | --- | --- | --- | --- | --- |
| | | | | first step | | second step | | | | | |
| | | | | current (kA) | welding time (cycle) | current (kA) | welding time (cycle) | | | | |
| 1 | 270 | 1.6 | 3.5 | 7 | 5 | 9 | 13 | not present | two-step adaptive control | good | Example |
| 2 | 270 | 1.6 | 3.5 | 7 | 5 | 9 | 13 | 10 | two-step adaptive control | good | Example |
| 3 | 270 | 2.0 | 5.0 | 4 | 10 | 10 | 15 | not present | two-step adaptive control | good | Example |
| 4 | 270 | 2.0 | 5.0 | 4 | 10 | 10 | 15 | 10 | two-step adaptive control | good | Example |
| 5 | 270 | 1.0 | 2.5 | 7 | 3 | 8 | 11 | not present | two-step adaptive control | good | Example |
| 6 | 270 | 1.0 | 2.5 | 7 | 3 | 8 | 11 | 10 | two-step adaptive control | good | Example |
| 7 | 270 | 1.6 | 4.0 | 5 | 8 | 8.5 | 14 | not present | two-step adaptive control | good | Example |
| 8 | 270 | 1.6 | 4.0 | 5 | 8 | 8.5 | 14 | 7 | two-step adaptive control | good | Example |
| 9 | 270 (galvanized) | 1.6 | 3.5 | 7 | 6 | 9.5 | 13 | not present | two-step adaptive control | good | Example |
| 10 | 270 (galvanized) | 1.6 | 3.5 | 7 | 6 | 9.5 | 13 | 10 | two-step adaptive control | good | Example |
| 11 | 980 | 1.6 | 3.5 | 5 | 5 | 7.5 | 13 | not present | two-step adaptive control | good | Example |
| 12 | 980 | 1.6 | 3.5 | 5 | 5 | 7.5 | 13 | 10 | two-step adaptive control | good | Example |
| 13 | 980 | 1.6 | 5.0 | 5 | 5 | 8.5 | 11 | not present | two-step adaptive control | good | Example |
| 14 | 980 | 1.6 | 5.0 | 5 | 5 | 8.5 | 11 | 10 | two-step adaptive control | good | Example |
| 15 | 980 (galvanized) | 1.6 | 5.0 | 5.5 | 6 | 8 | 12 | not present | two-step adaptive control | good | Example |
| 16 | 980 (galvanized) | 1.6 | 5.0 | 5.5 | 6 | 8 | 12 | 10 | two-step adaptive control | good | Example |
| 17 | 1180 | 1.0 | 5.0 | 6.3 | 4 | 6.5 | 10 | not present | two-step adaptive control | good | Example |
| 18 | 1180 | 1.0 | 5.0 | 6.3 | 4 | 6.5 | 10 | 10 | two-step adaptive control | good | Example |
| 19 | 270 | 1.6 | 3.5 | 7 | 5 | 9 | 13 | 10 | constant current control | poor; insufficient nugget diameter | Comparative Example |
| 20 | 270 | 1.6 | 3.5 | 9 | 16 | — | — | 10 | constant current control | poor; insufficient nugget diameter | Comparative Example |
| 21 | 270 | 1.6 | 3.5 | 9 | 16 | — | — | 10 | one-step adaptive control | poor: splashing occurred | Comparative Example |
| 22 | 270 | 1.6 | 3.5 | 9 | 5 | 9 | 13 | 10 | two-step adaptive control | poor: splashing occurred | Comparative Example |

As illustrated in Table 1, in all of the Examples, splashing did not occur, and a nugget with a diameter of $4.5\sqrt{t}$ or greater was obtained, yielding a good spot weld joint. This shows that resistance spot welding for obtaining a nugget with the necessary diameter is possible regardless of the presence of an existing weld.

By contrast, in the Comparative Examples that deviated from the appropriate range of this disclosure, either splashing occurred, or a nugget with a sufficient diameter did not form. In other words, under the constant current control in No. 19 and 20, the amount of heat generated was insufficient due to shunt current, and a nugget with a sufficient diameter did not form. Under the one-step adaptive control welding of No. 21, splashing occurred. Furthermore. No. 22 represents the case of performing the two-step adaptive control welding disclosed in PTL 4. In this case, a good nugget was obtained without splashing when the target nugget diameter was set to $4\sqrt{t}$, as described in PTL 4, but splashing was unavoidable when the target nugget diameter was increased to $4.5\sqrt{t}$ or greater, as illustrated in Table 1 of this application.

The invention claimed is:

1. A resistance spot welding method to join parts to be welded by squeezing and pressing the parts between a pair of electrodes and passing current, the parts being a plurality of overlapping metal sheets, the method comprising:
 performing test welding to form a nugget having a desired diameter by (i) passing welding current with constant current control between electrodes in two or more steps with a different constant current value in each step, and (ii) storing as a target value for each step a time variation of an instantaneous amount of heat generated per unit volume and a cumulative amount of heat generated per unit volume that are calculated from an electrical property between the electrodes;

subsequently, actual welding in two or more steps corresponding to the two or more steps in the test welding using, as a standard, a time variation curve of the instantaneous amount of heat generated per unit volume obtained by the test welding; and when a time variation amount of an instantaneous amount of heat generated per unit volume deviates during any step of the two or more steps in the actual welding from the time variation curve by a difference, controlling a current passage amount in order to compensate for the difference during a remaining welding time in the step so as to match a cumulative amount of heat generated per unit volume in the actual welding to the cumulative amount of heat generated per unit volume that is determined in advance in the test welding, wherein, in the test welding, $0.3 \times I_x \leq I_a < I_x$, where $I_a$ is a current in a first step, and $I_x$ is a current in second and subsequent steps.

2. The method of claim 1, wherein current is passed in the first step to secure a current path between the metal sheets or in the second and subsequent steps to obtain a predetermined nugget diameter.

* * * * *